(12) United States Patent
Chen et al.

(10) Patent No.: US 6,816,779 B2
(45) Date of Patent: Nov. 9, 2004

(54) PROGRAMMATICALLY COMPUTING STREET INTERSECTIONS USING STREET GEOMETRY

(75) Inventors: Feng-wei Chen, Apex, NC (US); Robert R. Cutlip, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 172 days.

(21) Appl. No.: 10/077,080

(22) Filed: Feb. 15, 2002

(65) Prior Publication Data

US 2003/0158661 A1 Aug. 21, 2003

(51) Int. Cl.$^7$ .............................................. G01C 21/26
(52) U.S. Cl. ...................... 701/200; 340/910; 340/445; 340/989; 345/442
(58) Field of Search ................................. 701/208, 206, 701/220, 117, 120, 201, 202, 209, 210, 211; 345/442, 443; 342/357.1, 357.13; 340/910, 945, 994, 988, 989

(56) References Cited

U.S. PATENT DOCUMENTS

| | | | | |
|---|---|---|---|---|
| 6,249,740 B1 | * | 6/2001 | Ito et al. ...................... | 701/200 |
| 6,339,746 B1 | * | 1/2002 | Sugiyama et al. ........... | 701/209 |
| 6,415,224 B1 | * | 7/2002 | Wako et al. .................. | 701/208 |
| 6,424,911 B2 | * | 7/2002 | Yamashita et al. ........... | 701/208 |
| 6,498,982 B2 | * | 12/2002 | Bellesfield et al. .......... | 701/202 |
| 6,510,382 B2 | * | 1/2003 | Wilson ......................... | 701/208 |
| 6,526,348 B1 | * | 2/2003 | McDonough ................. | 701/209 |
| 6,587,782 B1 | * | 7/2003 | Nocek et al. ................. | 701/200 |
| 2001/0025222 A1 | * | 9/2001 | Bechtolsheim et al. ...... | 701/209 |
| 2003/0060970 A1 | * | 3/2003 | Edge ............................ | 701/200 |
| 2003/0083805 A1 | * | 5/2003 | Stefan et al. ................. | 701/200 |

* cited by examiner

*Primary Examiner*—Thomas G. Black
*Assistant Examiner*—Tuan C To
(74) *Attorney, Agent, or Firm*—Gerald R. Woods; Marcia L. Doubet

(57) ABSTRACT

Techniques are disclosed for programmatically deriving street intersections from address data which is presented in textual format, or alternatively, from street geometry data which has been derived from such address data. Preferred embodiments leverage built-in functions and data types of a spatially-enabled object relational database system. Information about streets is analyzed to determine which streets intersect, as well as the intersection locations. This information is stored in a spatially-enabled table for subsequent retrieval. The derived street intersections data supports retrievals which do not rely on proprietary file formats or binary files, thereby enabling faster retrievals and reduced resource consumption requirements. The derived street intersection information may be used in many ways, such as to compute a path from one location to another.

15 Claims, 12 Drawing Sheets

Minor Geometry Tables

Address Table 500

| addr_id | address | street_id | city | state | zipcode | PT<x,y> |
|---|---|---|---|---|---|---|
| 1 | 123 High House Rd | 123 | Apex | NC | 27502 | <35.9,78.2> |
| 2 | 123 Hudson Rd | 456 | Raleigh | NC | 28971 | <34.567,78.3> |
| 3 | 123 Davis Dr | 789 | Cary | NC | 27676 | <45.789,78.9 |

Street Table 530

| street_id | start_Pt | name | envelope | linestring | PointZM |
|---|---|---|---|---|---|
| 123 | <35.8,67.9> | High House Rd | (bounding box) | constructed when address inserted into table | <1,3,1,100> x=state_id y=city_id z=zip_id m=density point |
| 456 | <35.67,67.85> | Hudson Rd | b.b | | <1,1,5,1> |
| 789 | <35.77,67.99> | Davis Dr | b.b | | <1,2,6,1> |

Intersection Table 560

| inter_id | street_id | intersect_id (stored as text string) | intersect_pt (multiple pts) |
|---|---|---|---|
| 1 | 123 | 456 | <35.66,78.92> |
| 2 | 456 | 123,789 | <35.66,78.92> <36.88,78.92> |
| 3 | 789 | 456 | <36.88,78.92> |

Intersection Table 210

| inter_id | street_id | intersect_id (stored as text string) | intersect_pt (multiple pts) |
|---|---|---|---|

City Table 220

| city_id | state_id | name | envelope | polygon |
|---|---|---|---|---|

State Table 230

| state_id | name | envelope | polygon |
|---|---|---|---|

Address Table 240

| addr_id | address | street_id | city_id | state_id | zip_id | PT<x,y> |
|---|---|---|---|---|---|---|

Street Table 250

| street_id | start_Pt | name | envelope | linestring | PointZM |
|---|---|---|---|---|---|

Points of Interest 270

| rid | type | name | phone |
|---|---|---|---|

Zip code Table 260

| zip_id | city_id | state_id | zipcode | envelope | polygon |
|---|---|---|---|---|---|

FIG. 3

| | |
|---|---|
| 310 | 123 High House Rd, Apex, NC  27502 |
| 320 | 123 Hudson Rd, Raleigh, NC  28971 |
| 330 | 123 Davis Dr, Cary, NC  27676 |

300

Major Geometry Tables

FIG. 4

State Table 400

| state_id | abbr_name | name | envelope | polygon |
|---|---|---|---|---|
| 1 | NC | North Carolina | (b,b) | (p,p,p,p) |
| 2 | SC | South Carolina | (b,b) | (p,p,p,p) |
| 3 | VA | Virginia | (b,b) | (p,p,p,p) |

City Table 430

| city_id | state_id | name | envelope | polygon |
|---|---|---|---|---|
| 1 | 1 | Raleigh | (b,b) | (p,p,p) |
| 2 | 1 | Cary | (b,b) | (p,p,p) |
| 3 | 1 | Apex | (b,b) | (p,p,p) |
| 4 | 1 | RTP | (b,b) | (p,p,p) |
| 5 | 2 | Charleston | (b,b) | (p,p,p) |

Zip code Table 460

| zip_id | city_id | state_id | zipcode | envelope | polygon |
|---|---|---|---|---|---|
| 1 | 3 | 1 | 27502 | (b,b) | (p,p,p) |
| 2 | 1 | 1 | 27707 | (b,b) | (p,p,p) |
| 3 | 1 | 1 | 27560 | (b,b) | (p,p,p) |
| 4 | 4 | 1 | 27709 | (b,b) | (p,p,p) |

FIG. 5
Minor Geometry Tables

Address Table 500

| addr_id | address | street_id | city | state | zipcode | PT<x,y> |
|---|---|---|---|---|---|---|
| 1 | 123 High House Rd | 123 | Apex | NC | 27502 | <35.9,78.2> |
| 2 | 123 Hudson Rd | 456 | Raleigh | NC | 28971 | <34.567,78.3> |
| 3 | 123 Davis Dr | 789 | Cary | NC | 27676 | <45.789,78.9 |

Street Table 530

| street_id | start_Pt | name | envelope | linestring | PointZM |
|---|---|---|---|---|---|
| 123 | <35.8,67.9> | High House Rd | (bounding box) | constructed when address inserted into table | <1,3,1,100> x=state_Id y=city_Id z=zip_id m=density point |
| 456 | <35.67,67.85> | Hudson Rd | b.b | | <1,1,5,1> |
| 789 | <35.77,67.99> | Davis Dr | b.b | | <1,2,6,1> |

Intersection Table 560

| Inter_id | street_id | intersect_id (stored as text string) | intersect_pt (multiple pts) |
|---|---|---|---|
| 1 | 123 | 456 | <35.66,78.92> |
| 2 | 456 | 123,789 | <35.66,78.92> <36.88,78.92> |
| 3 | 789 | 456 | <36.88,78.92> |

PROGRAMMATICALLY COMPUTING STREET INTERSECTIONS USING STREET GEOMETRY

RELATED INVENTIONS

The present invention is related to U.S. Pat. No. 6,658,356 (Ser. No. 10/077,547), entitled "Programmatically Deriving Street Geometry from Address Data"; U.S. patent application Ser. No. 10/077,079, entitled "Adapting Point Geometry for Storing Address Density"; and U.S. patent application Ser. No. 10,077,146, entitled "Programmatically Calculating Paths from a Spatially-Enabled Database", each of which was filed concurrently herewith and which is hereby incorporated herein by reference. These patents are commonly assigned to the International Business Machines Corporation ("IBM"). The latter of these patents is referred to hereinafter as "the path computation invention".

BACKGROUND OF THE INVENTION

1. Field of the Invention

The present invention relates to spatially-enabled computer databases, and deals more particularly with techniques for programmatically computing street intersections using street geometry.

2. Description of the Related Art

Geographic information systems are known in the art and store geographic or cartographic (i.e. map-oriented) data. Systems are also known in the art for using relational databases to process (e.g. store and access) this type of geographic data. When a relational database is adapted for use with geographic information system ("GIS") data, the database is often referred to as "spatially-enabled".

Geographic data pertains to physical locations, and when using 2 dimensions, is typically expressed in terms of latitude and longitude. The latitude and longitude values for a particular location are given relative to fixed points of reference, using a coordinate system in which a latitude value represents an offset from the equator and a longitude value represents an offset from the prime meridian.

Geographic data may describe the physical location or area of a place or thing, or even the location of a person. When geographic data is stored in a spatially-enabled database, it is stored using a geometric model in which locations/areas are expressed in terms of geometric shapes or objects. The geometric data stored according to this model may also be referred to as "spatial data". In addition to locations or areas of geographic objects, spatial data may also represent relationships among objects, as well as measurements or distances pertaining to objects. As an example of relationships among objects, spatial data may be used to determine whether a geometric shape corresponding to the location of a particular bridge intersects a geometric shape corresponding to the location of a river (thus determining whether the bridge crosses the river). As an example of using spatial data for measurements or distances, the length of a road passing through a particular county could be determined using the geometric object representing the road and a geometric object which specifies the boundaries of the county.

Spatial data values are expressed in terms of "geometry" or "geometric" data types. Thus, the location of a landmark might be expressed as a point having (x,y) coordinates, and the perimeter of a lake might be defined using a polygon. Typical spatially-enabled database systems support a set of basic geometry data types and a set of more complex geometry data types, where the basic types comprise points, line strings, and polygons, and the complex types comprise collections of points, collections of line strings, and collections of polygons.

A common geometric model used by spatially-enabled database systems is shown in FIG. 1. As shown therein, the model is structured as a hierarchy or tree 100 having geometry 105 as its root, and having a number of subclasses. Point 110, linestring 120, and polygon 130 represent the basic geometry data types. In this model 100, linestring 120 is a subclass of curve 115, and polygon 130 is a subclass of surface 125. Geometry collection class 135 is the root of a subtree representing the more complex geometric data types, and each subclass thereof is a homogeneous collection. Multipolygon 145, multistring 155, and multipoint 160 represent the collections of polygons, line strings, and points, respectively. Multipolygon 145 is a subclass of multisurface 140 in this model, and multistring 155 is a subclass of multicurve 150. Only the classes which are leaves of this tree 100 are instantiable in typical spatially-enabled database systems; the other nodes correspond to abstract classes. (Each of these entities is an actual data type.)

Referring now to the basic data types in particular, geometric data according to the model 100 of FIG. 1 may be expressed in terms of a single point having (x,y) coordinates, or may be described as a line string or a polygon. A line string may be considered as one or more line segments which are joined together, and is defined using an ordered collection of (x,y) coordinates (i.e. points) that correspond to the endpoints of the connected segments. A polygon is defined using an ordered collection of points at which a plurality of line segments end, where those line segments join to form a boundary of an area.

Many different examples may be imagined where points, line strings, and polygons can be used for describing locations or areas. A point might represent the location of a landmark such as a house or a building, or the intersection of two streets. A line string might be used to describe a street, or the path of a river or power line, or perhaps a set of driving directions from one location to another. A polygon might be used to describe the shape of a state or city, a voting district, a lake or any parcel of land or body of water.

Once spatial information has been stored in a database, the database can be queried to obtain many different types of information, such as the distance between two cities, whether a national park is wholly within a particular state, and so forth.

Early geographic information systems relied on proprietary data formats. A widely popular example is the ".shp" shape format. These shape files contain binary data that may represent points, line strings, or polygons relating to geographic locations or areas. Another commonly-used proprietary data format is known as ".EDG". Files using EDG format contain binary data that provides a mapping between an address and its 2-dimensional geographic location. Efforts have been made in recent years to define open, standardized data formats for GIS data, in order to facilitate exchange of data between systems. This work is characterized by two data formats known as "well known text" and "well known binary", or simply "WKT" and "WKB". The Open GIS Consortium, Inc. ("OGC") is an industry consortium which promulgates standardized specifications including these data formats. The data formats are termed "well known" because they are standardized and therefore non-proprietary. Typical spatially-enabled database systems support one or more of these four data formats.

As one example of a spatially-enabled database, a feature known as "Spatial Extender" can be added to IBM's DB2® relational database product to provide GIS support. Spatial Extender provides support for the geometric data types shown in FIG. 1, and provides a number of built-in functions for operating on those data types. When using Spatial Extender, spatial data can be stored in columns of spatially-enabled database tables by importing the data or deriving it. The import process uses one of the WKT, WKB, or ".shp" shape formats described above as source data, and processes that data using built-in functions to convert it to geometric data. For example, WKT format data may be imported using "geometryFromText" functions; similar functions are provided for WKB format data ("geometryFromWKB") and ".shp" shape data ("geometryFromShape"). Spatial data may be derived either by operating on existing geometric data (for example, by defining a new polygon as a function of an existing polygon) or by using a process known as "geocoding". A geocoder is provided with Spatial Extender that takes as input an address in the United States, and derives a geometric point representation. Other geocoders can be substituted to provide other types of conversions.

Refer to "IBM® DB2® Spatial Extender User's Guide and Reference", Version 7.2, published by IBM in July 2001 as IBM publication SC27-0701-01, for more information on Spatial Extender. This User's Guide is hereby incorporated herein as if set forth fully, and is hereinafter referred to as the "Spatial Extender User's Guide". ("IBM" and "DB2" are registered trademarks of IBM.)

Another example of a spatially-enabled database is the IBM Informix® Spatial DataBlade® product. This database is described in "SDE Version 3.0.2 for Informix Dynamic Server, Spatial DataBlade Reference Manual", published on the Internet at location http://www.esri.com/software/sde/pdfs/datablade.pdf. Spatial DataBlade also supports the geometric types shown in FIG. 1, and the WKT, WKB, and ".shp" shape formats. This Reference Manual is referred to hereinafter as the "Spatial DataBlade® Reference Manual". ("Informix" and "DataBlade" are registered trademarks of IBM.)

While WKT is an open, interchangeable data format, it may be considered as a relatively "artificial" or "contrived" format for source data. That is, all geometric data that is expressed in WKT format must be specified using particular syntax conventions. To represent the point having an x-coordinate of 12 and y-coordinate of 25, commonly denoted as (12,25), for example, the following WKT syntax is used:

'point (1225)'

Extensions have been defined to WKT and WKB formats for supporting 3-dimensional data—that is, allowing points to be expressed with a z-coordinate as well as x- and y-coordinates. (An extension is also defined for a fourth dimension, whereby measurement information can be added to a data value.) To express a 3-dimensional point in WKT format, a syntax that differs slightly from the 2-dimensional syntax is used. Suppose this 3-dimensional point has coordinates (12,25,55). The WKT representation of this point is then:

'point z (12 25 55)'

The syntax for line strings and polygons is similar to that used for points, yet is different in some respects. Given a square polygon having vertices at (0,0), (1,0), (1,1), and (0,1), the WKT representation is:

'polygon ((00, 10, 11, 01, 00))'

A detailed discussion of the WKT syntax, including syntax examples for each possible permutation of geometry type, may be found in "Appendix C, The well-known text representation for OGIS geometry", of the Spatial DataBlade® Reference Manual.

As will be readily apparent, this type of textual representation of geometric data does not naturally occur in textual documents; instead, geometric data must be specially adapted for, or converted to, this type of textual representation.

SUMMARY OF THE INVENTION

An object of the present invention is to provide improved techniques for deriving street intersections.

Another object of the present invention is to provide techniques for deriving street intersections using street geometry data stored in a spatially-enabled database, enabling the intersection information to be subsequently queried without requiring use of WKT, WKB, ".shp" shape, or EDG files.

A further object of the present invention is to define techniques for creating street intersections data from readily-available textual address information.

Still another object of the present invention is to provide improved ways for storing street intersections.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for programmatically computing street intersections using street geometry. In a preferred embodiment, this technique comprises: obtaining street geometry information for a first street; comparing the object street geometry information for the first street to obtained street geometry information for one or more other streets to determine intersecting ones of the one or more other streets; and for each of the intersecting ones, storing a geographic location of a point of the intersection, along with an identification of the first street address and the identification of the intersecting one.

The obtained street geometry information may originate from textual address information (and may be dynamically computed from such textual address information), or may be retrieved from a database table. The geographic location preferably comprises latitude and longitude values of the obtained intersection point, and these geographic locations are preferably stored as geometric data.

The storing operation preferably further comprises storing a reciprocal comprising the geographic location of a point of the intersection, along with the identification of the intersecting one and the identification of the first street address. The storing preferably further comprises creating or updating one or more rows in a relational database table.

Comparing the obtained street geometry preferably further comprises comparing a geometric line representation of the first street to the geometric line representation of each of the one or more other streets. Furthermore, this comparison may be preceded by comparing a bounding box corresponding to the geometric line representation of the first street to the bounding box corresponding to the geometric line representation of each of the one or more other streets, as a precondition to the comparing the geometric line representations wherein the comparison of the geometric line representations is only performed if the comparison of the bounding boxes determines a potential intersection.

Typically, the obtaining, comparing, and storing operations will be repeated for at least one of the one or more other streets.

The present invention may also be used advantageously in methods of doing business. For example, the street intersections data created through use of the present invention can be used to support a wide variety of business services, such as pay-for-access services that use the street intersection data for business applications.

The present invention will now be described with reference to the following drawings, in which like reference numbers denote the same element throughout.

BRIEF DESCRIPTION OF THE DRAWINGS

FIG. 2 illustrates a spatial data mart schema, having tables and relationships which are created according to preferred embodiments of the present invention;

FIG. 3 provides sample input data, for purposes of illustrating operation of preferred embodiments of the present invention;

FIGS. 4 and 5 illustrate in more detail the individual tables of the spatial data mart, according to preferred embodiments of the present invention;

DESCRIPTION OF PREFERRED EMBODIMENTS

Figure 1:
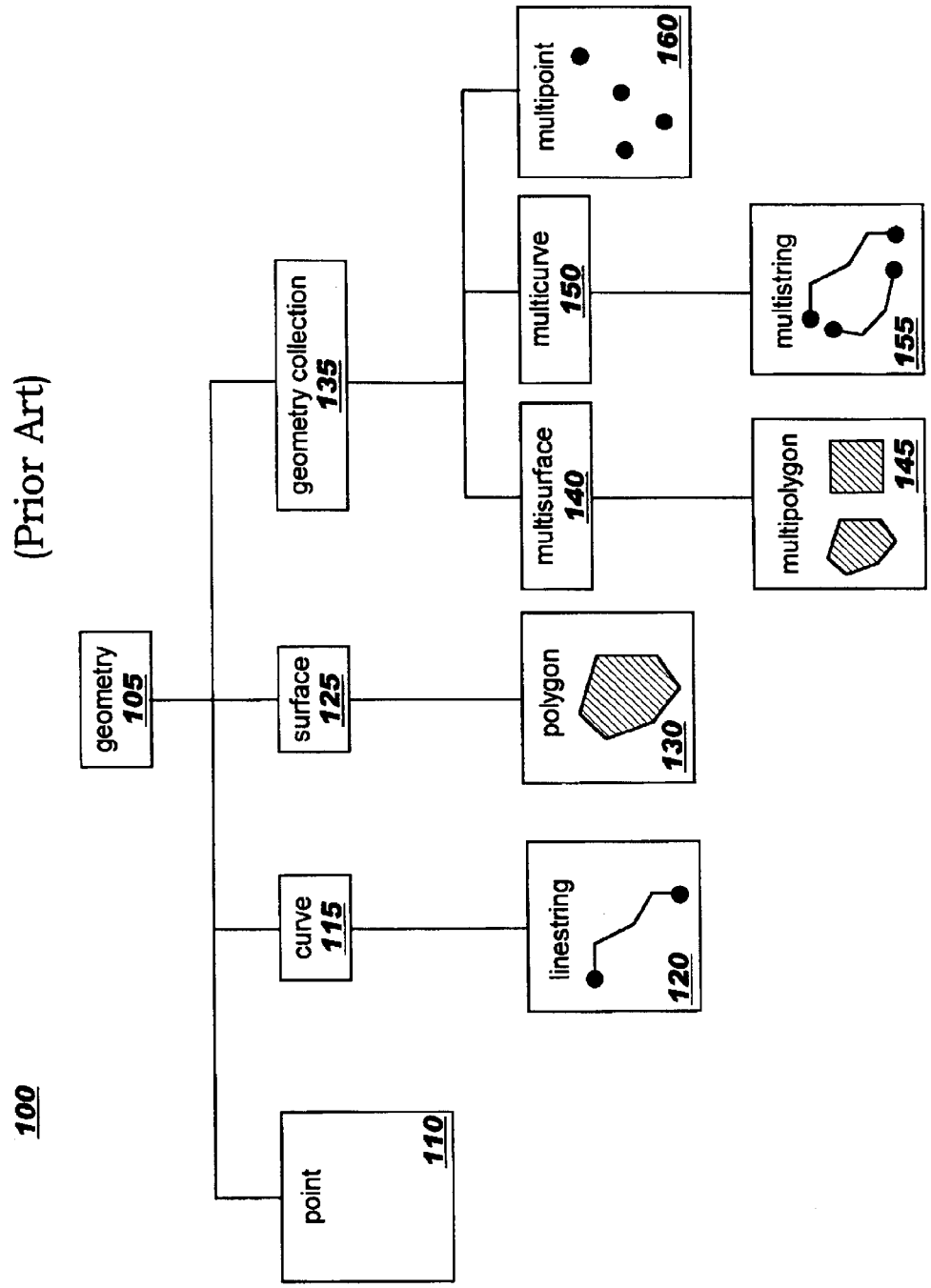
FIG. 1 illustrates a common geometric model used by spatially-enabled database systems, according to the prior art.

The present invention defines techniques for programmatically deriving street geometry, and in particular street intersections, from address data. In contrast to prior art techniques, the address data is not required to be in WKT, WKB, or EDG street file form; by avoiding a reliance on these file types, the amount of storage required may be greatly reduced. Preferably, the address data used by the present invention is obtained in a textual format as a collection of addresses. This collection of addresses can then be processed, according to preferred embodiments, to extract information which is used to populate a spatially-enabled street table in a relational database. (A number of other tables may be populated from this information as well, as will be described.) Address collections of this type are available from a variety of sources. For example, the United States government has collections of address data compiled by the Census Bureau. Commercial sources include telephone companies and direct marketing associations. Preferably, the collection of addresses is encoded in a human-readable textual format.

The street intersections may be programmatically determined from the stored street geometry, or alternatively may be dynamically determined while processing the address data (e.g. to create the stored street geometry).

After storing the derived street geometry (and optionally, other address information) in a spatially-enabled relational database, using the techniques disclosed herein, operations on that data—such as retrievals to satisfy database queries—can leverage the native data normalization and data management facilities provided by the database system. The spatial extensions, geometric data types, grid indexing functions, user-defined functions, and built-in procedures of the database system can also be leveraged to optimize operations on the stored street and address information. In this manner, operations on the stored data can use optimized built-in functions of the database system, rather than requiring an applications programmer to provide complex code in his/her application for interacting with street and address data. As a result, programmer efficiency is increased and code complexity is reduced, thereby leading to decreased program development and support costs. Furthermore, use of the optimized built-in database functions for interacting with the stored data will typically increase the efficiency of application programs. Retrievals which use the street geometry data which is derived and stored according to the present invention no longer need to rely on proprietary formats or binary files, thus offering a number of advantages including increased speed and reduced system resource requirements. In addition, data maintenance may be accomplished more easily, providing flexible update, delete, and insert operations which will not be subject to a proprietary company's development cycles.

Preferred embodiments of the present invention are implemented in a DB2® object relational database system in which the Spatial Extender feature has been installed to provide spatial data support. Thus, references hereinafter to particular function names should be interpreted as references to DB2 and/or Spatial Extender functions unless otherwise noted. (When the present invention is implemented in another database system, functions providing analogous support may be substituted for the functions referenced herein without deviating from the scope of the present invention. Furthermore, it should be noted that while examples are provided herein using particular function names and syntax, these examples are merely illustrative.)

The textual input data from which street geometry is derived may contain a number of different types of values which, taken collectively, may be referred to as "address data". The textual data may also contain non-address-related information, such as the names of people and/or a business associated with a particular address. For example, a representative entry in the textual input data file might be as follows:

John and Mary Doe, 123 Main Street, Raleigh, N.C. 27613 (919) 555-1212

In this example, names and a phone number are present, in addition to a street address, city, state, and zip code. An implementation of the present invention may choose to store the names and phone number (and other non-address-related information that might appear in a particular textual input data file); however, such data is not pertinent to an understanding of the present invention and therefore will not be discussed further herein. Instead, preferred embodiments of the present invention are directed toward use of the street address, city, state, and zip code information. Hereinafter, the term "address data" is intended to refer to a collection comprising street address, city, state, and zip code (or, for non-U.S. addresses, a collection comprising the analogous information).

Referring now to FIG. 2, a spatial data mart 200 is shown which is representative of a schema on which preferred embodiments of the present invention may be modeled. In this data mart 200, each record (i.e. row) of an address table 240 contains address information extracted from the source address file, including pointers or references to/from several other tables. In the representative schema in FIG. 2, those other tables are an intersection table 210, a city table 220, a state table 230, a street table 250, and a zip code table 260.

In addition, an optional enhancement of the present invention may include one or more side tables, such as points of interest table 270. (Note that these side tables are not a requirement of the present invention, thus, the dashed rectangle surrounding points of interest table 270 in FIG. 2 indicates that this is an optional table.)

FIGS. 4–5 illustrate the tables of the spatial data mart in more detail, and provide sample values. Suppose that the three records 310, 320, 330 shown in the sample input file 300 of FIG. 3 represent address data that is to be processed by the present invention. Each record in this sample input file contains a street address, which includes both a number (i.e. an address of a location on the street) and a street name; a city name; a state name; and a zip code value. (An input file used by an implementation of the present invention will typically contain many records, as will be obvious, even though only three records are shown in the sample input file.)

FIG. 4 provides sample values for the state table 400, city table 430, and zip code table 460. These tables correspond to tables 230, 220, and 260 of the spatial data mart schema illustrated in FIG. 2. Logic which may be used to populate tables 400, 430, 460 is described below with reference to the flowcharts in FIGS. 6–8, respectively.

The state table 400 includes a row for each state having an entry in the address table 500, described below. Each row includes a unique index or key value ("state_id" in the example), which is commonly referred to as a primary key in relational database systems. (Techniques for generating a primary key for a database record are well known in the art. For purposes of describing the present invention, the primary keys in most tables are shown as incremented integer values.) Each row also preferably includes both the postal code abbreviation ("abbr_name") and full name ("name") for individual ones of those states.

An "envelope" column contains the envelope, or bounding box, associated with the geometry represented by the "polygon" column. (The polygon column represents the boundary of this state, and the envelope column provides a bounding box for that boundary.) Spatially-enabled database systems provide built-in functions for generating a bounding box for a particular geometry object. The "ST_Envelope" function of Spatial Extender, for example, may be used to generate a best-guess approximation of a bounding box. The resulting bounding box is a rectangle, and the bounding box returned by ST_Envelope is denoted by two points which correspond to the lower left and upper right coordinates of this rectangle. The polygon column may contain a number of <x,y> coordinates, and thus it should be understood that the "(p,p,p,p)" representation in the sample rows is merely for purposes of illustration. Preferred embodiments store the polygon as a geometric data type.

City table 430 includes a row for each city which has an entry in the address table 500. Each row includes a unique index ("city_id" in the example). A "state_id" column provides a pointer or reference (known as a foreign key in relational database systems), referring to the record in the state table which corresponds to this city. Thus, the first four rows of table 430 indicate that these cities are in North Carolina (having a "state_id" value of "1"; see the first row of table 400), and the fifth row of table 430 indicates that this city is in South Carolina (having a "state_id" value of "2"). Each row of city table 430 also preferably contains a textual "name" column, having the city name, and an "envelope" column and "polygon" column. The envelope column stores a bounding box corresponding to the boundary of the city (as described by it's polygon value). The envelope and polygon columns are analogous to those which have been described for state table 400.

Zip code table 460 includes a row for each zip code which has an entry in the address table 500. Each row includes a unique index ("zip_id" in the example) for the zip code which is itself stored in this row (in textual form in the column which, in this example, is named "zipcode"), and preferably includes foreign key references to records in the city table and state table (using the "city_id" and "state_id" columns, respectively). Each zip code row therefore identifies the city and state in which this zip code is located. Thus, the first row of zip code table 460 indicates that the zip code "27502" is in Apex, N.C. (having a "city_id" of "3" and a "state_id" value of "1"; see the third row of table 430 and the first row of table 400, respectively). Preferably, each row of zip code table 460 also contains an "envelope" column and "polygon" column. The envelope column stores a bounding box corresponding to the boundary of the zip code (as described by it's polygon value). The envelope and polygon columns are analogous to those which have been described for state table 400.

The records in address table 500 of FIG. 5 are constructed while processing the records of the input file, as will be described in detail below with reference to FIGS. 9 and 10. (Address table 500 corresponds to address table 240 of FIG. 2.) The columns of address table 500 will now be described.

Each record in address table 500 has a unique index ("addr_id" in this example). In preferred embodiments, the full street address is stored in a column ("address" in this example) of the address table, in text format. A "street_id" column provides a pointer or reference which refers to a record in the street table 530. (This pointer provides a link between the address record in table 500 and the geometry data for the corresponding street. Preferably, this value is an alternate key whose value is unique in each row.) The "city", "state", and "zipcode" columns of address table 500 preferably store a textual representation of the city name, state name, and zip code associated with this address. Optionally, the key value corresponding to the values in one or more of these columns may be stored in addition to, or instead of, the textual values. Considerations in the choice of storage representation for these values include anticipated use of the data mart.

The last column of address table 500, designated as "PT<x,y>", contains latitude and longitude values in preferred embodiments. Values in the PT<x,y> column are stored as geometric data in preferred embodiments. In some cases, information from which these point values can be created may be provided in the source data file. For example, a textual representation of the latitude and longitude may be provided, and this textual form can then be converted to point geometry using built-in functions. Alternately, the point geometry may be determined from a separate source. For this latter case, one manner in which these values may be obtained and added to the data in the input records (such as records 310, 320, 330 of FIG. 3) when constructing table 500 will be discussed below. (Note that conventional latitude and longitude values may in some cases be expressed using negative numbers. For performance gains, spatially-enabled databases typically apply an offset factor such that all latitude and longitude values are stored as positive numbers. This distinction is not pertinent to an understanding of the present invention, and thus references herein to storing latitude and longitude should be interpreted as including this offset form.)

Street table 530 contains street geometry data, and table 530 corresponds to street table 250 in the data mart schema representation in FIG. 2. Values in the rows of street table 530 are created while processing the input file, as will be described with reference to FIG. 10. The sample values in the three rows of street table 530 represent the three sample rows of address table 500. (In an actual spatially-enabled database, address table 500 may contain many more rows than street table 530.) Each row of street table 530 begins with a key ("street_id" in this example) that refers to the street_id column of address table 500. The starting point ("start_Pt") for each street is preferably stored as a column of the street table, using an <x,y> coordinate representation of the latitude and longitude where (for purposes of the set of data in this database) this street begins. The street name is preferably stored in text form within each record (in the column "name", in this example). Each row also preferably contains an "envelope" column and a "linestring" column, where the envelope column stores a bounding box corresponding to the path taken by this street. The value of the envelope column is created in a manner that is analogous to that which has been described for the envelope column of the state table 400, by invoking the ST_Envelope function with the street's linestring as an input parameter.

The last column of street table 530, designated as "PointZM", is a 4-dimensional value in preferred embodiments. As discussed earlier, 3-dimensional and 4-dimensional extensions have been defined for the WKT and WKB formats, and the PointZM form <x,y,z,m> corresponds to this 4-dimensional extension. According to preferred embodiments, the values of these 4 dimensions are used in a novel way to provide a compact technique for storing information about the corresponding street. Prior art uses for these four dimensions provide a latitude, longitude, elevation/depth, and measure/distance value. (As stated earlier, values which result after applying an offset may be stored in these dimensions, rather than actual values, but that distinction is not pertinent to the present discussion.) As defined by the present invention, the first dimension of PointZM entries in table 530 stores a state_id value, which provides a reference to the state table (see table 400 of FIG. 4);

the second dimension stores a city_id value, providing a reference to the city table (see table 430 of FIG. 4);

the third dimension stores a zip_id value, providing a reference to the zip code table (see table 460 of FIG. 4); and the fourth dimension stores a density value, representing the density of addresses on this particular street.

In an alternative embodiment, the fourth dimension may be omitted, and the novel interpretation of the remaining three dimensions may be used. Furthermore, for locations which are not identified by a state, city, and zip code (such as non-United States addresses), the postal code equivalent or equivalent geographical location descriptors may be substituted for the values of these dimensions. (Similarly, the state and zip code tables may be replaced by tables containing other location descriptors, and the corresponding columns in other tables may be similarly adapted, as will be obvious.)

The value of the starting point, envelope, linestring, and PointZM columns are computed while processing the input file, as will be described in more detail with reference to the flowcharts in FIGS. 6–10.

The intersection table 560 in FIG. 5 is generated in an optional aspect of the present invention, and stores information about intersections of streets. This table 560 corresponds to table 210 in FIG. 2. A technique for generating the rows of table 560 is described below with reference to FIGS. 11 and 12.

In preferred embodiments, each record in intersection table 560 has a unique key "inter_id", and a "street_id" column which contains a reference to an entry in the address table 500. Thus, the record stores the intersections for that particular street. Additional columns in the intersection table 560 are "intersect_id" and "intersect_pt". In preferred embodiments, the intersect_id column stores a comma-separated list of text string values (where these values identify other street records in the street table—namely, the street records for those streets that intersect the street identified by street_id) and the intersect_pt column stores a list of <x,y> points representing the location of each of the intersections. Thus, in the example, the first row indicates that High House Rd (having street_id "123"; see street table 530) has an intersection with Hudson Rd (having street_id "456"), and this intersection is located at <35.66, 78.92>. Storing the identification of intersecting streets in the intersection table in text form enables very fast look-up operations, such as those described in the path computation invention. Preferably, the Text Extender feature of DB2 is used, such that this text data can be searched with a linguistic matching operation. (Refer to "DB2 Text Extender Administration and Programming", Version 5.2 (1996, 1998), published by IBM, for more information about Text Extender.)

Turning now to the flowcharts in FIGS. 6–11, logic which may be used to implement a preferred embodiment of the present invention will now be described.

Figure 6:
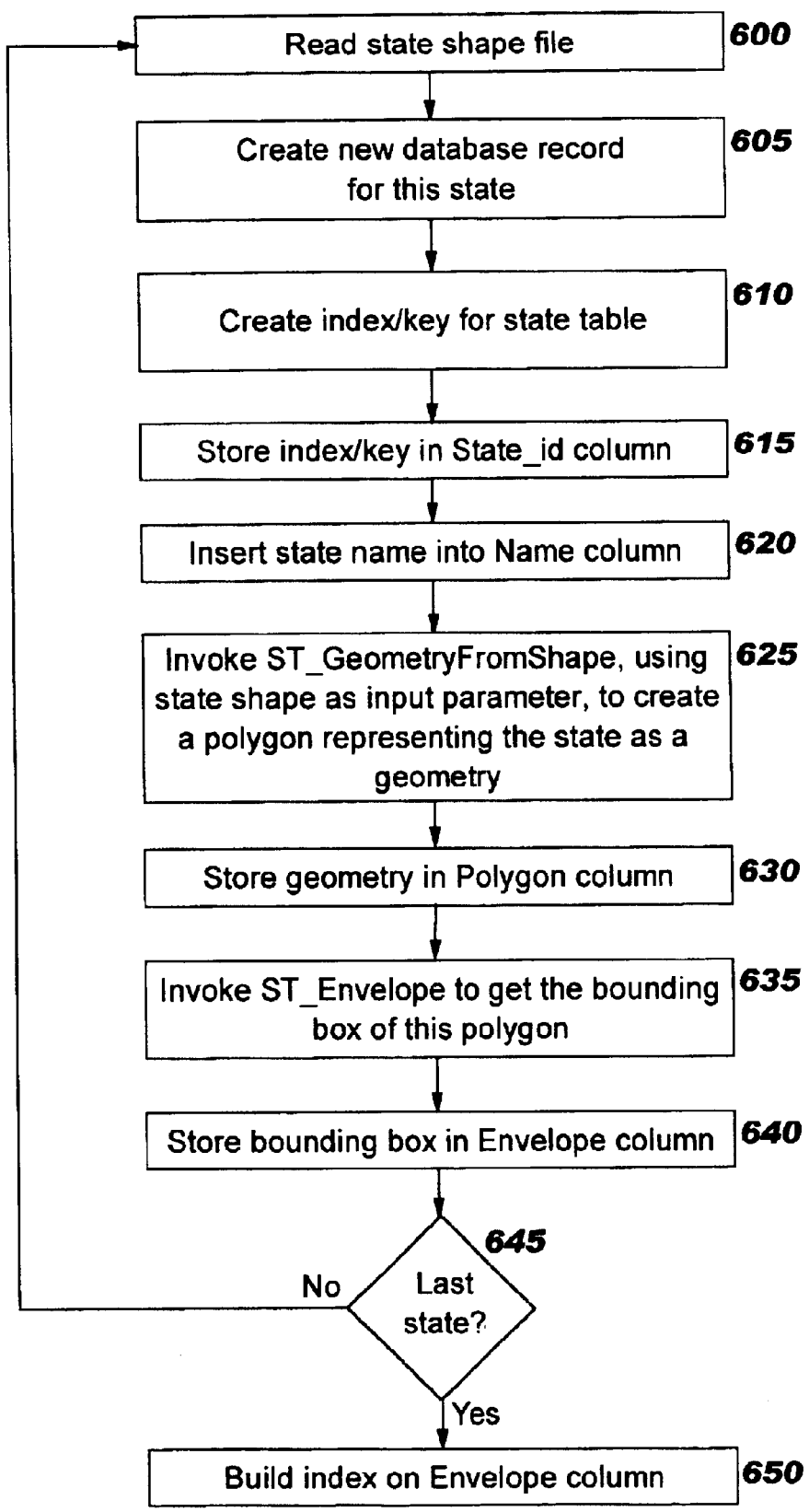
FIGS. 6–11 provide flowcharts which illustrate logic that may be used to implement preferred embodiments of the present invention.

FIG. 6 provides logic which may be used to populate state table 400 of FIG. 4. The process begins at Block 600, where a state shape file (preferably encoded as an ".shp" shape file) is read. Block 605 creates a new record (i.e. row) to represent this state in the state table, and Blocks 610–640 populate the columns of that row. Block 610 generates a primary key to be used as an index to this row. This index value may be created in several different ways, without deviating from the inventive concepts disclosed herein. As one example, a counter may be used, and each new state may be assigned an integer index value by incrementing this counter. As another example, the state name may be hashed to create an index value. In preferred embodiments, existing database functions are leveraged. For example, DB2 provides an identity column which will generate a unique key for each new inserted row. Or, a sequence number function may be used, which provides additional functions. (Refer to version 7.2 of DB2 for this latter function.) The generated value is stored in the "state_id" column (Block 615).

The textual state name is stored in the "name" column (Block 620). Preferably, the state name associated with the current shape file is used for this purpose. The manner in which this association is represented does not form part of the present invention. In one approach, the iterative process of FIG. 6 may be driven by extracting the state names from the textual address input file (in which case the current state name is available while iterating through these extracted names), and then retrieving a corresponding state shape file for each of those state names. In another approach, a list of the 50 state names may be processed, and a state shape file for each of those state names is retrieved to begin the processing shown in FIG. 6. The state name for a particular state may form part of the shape file's naming structure. (For example, the state shape file for North Carolina might be named "nc.shp".)

The postal code abbreviation for the current state's name (i.e. the 2-character abbreviation thereof) is also preferably stored in the state table, using the "abbr_name" column of the example, during the processing of Block 620. Given the full name for a particular state, the postal code abbreviation can be readily obtained (and vice versa). Thus, references herein to using the state name (e.g. for looking up information in the state table) may alternatively use the postal code abbreviation.

The state shape file obtained at Block 600 is passed as an input parameter to a built-in function, which in preferred embodiments is the "ST_GeometryFromShape" function (Block 625). This built-in function will return a polygon when the input parameter represents a state's shape file; that polygon defines the perimeter or boundary of the state. This polygon is stored in the "polygon" column of the state file (Block 630). A built-in function is then invoked (Block 635) to generate a bounding box corresponding to this polygon. In preferred embodiments, this built-in function is "ST_Envelope". The bounding box which is returned from the invocation is stored in the "envelope" column of the state file (Block 640).

As will be obvious to one of ordinary skill in the art, the order of operations in FIG. 6 is merely illustrative of one way in which this logic may be implemented. Furthermore, it will be obvious that the individual column values are not necessarily written into the columns one at a time, although the blocks of FIG. 6 depict this approach for purposes of describing each of the values; instead, the values are preferably stored in a buffer and written to the database record in a single operation. (Similarly, the order of operations in the remaining flowcharts is merely illustrative, and a buffering approach is preferably used when creating the records described therein.)

Upon reaching Block 645, the new database record has been populated. Block 645 then checks to see if this was the last state that needed to be processed. Refer to the discussion of Block 620, above, for a description of how the set of states to be processed may be determined. If the test in Block 645 has a negative result (i.e. there are still more states), then control returns to Block 600 to begin processing the next state; otherwise, processing continues at Block 650.

Block 650 builds an index on the "envelope" column of the state table. This index may be used for faster retrieval of envelope values. However, creation of this index may be omitted without deviating from the scope of the present invention. In preferred embodiments, the built-in function "db2gse.gse_enable_idx" may be used for creating this index (as well as the other indexes on columns of tables which are discussed with reference to subsequent flowcharts).

Figure 7:
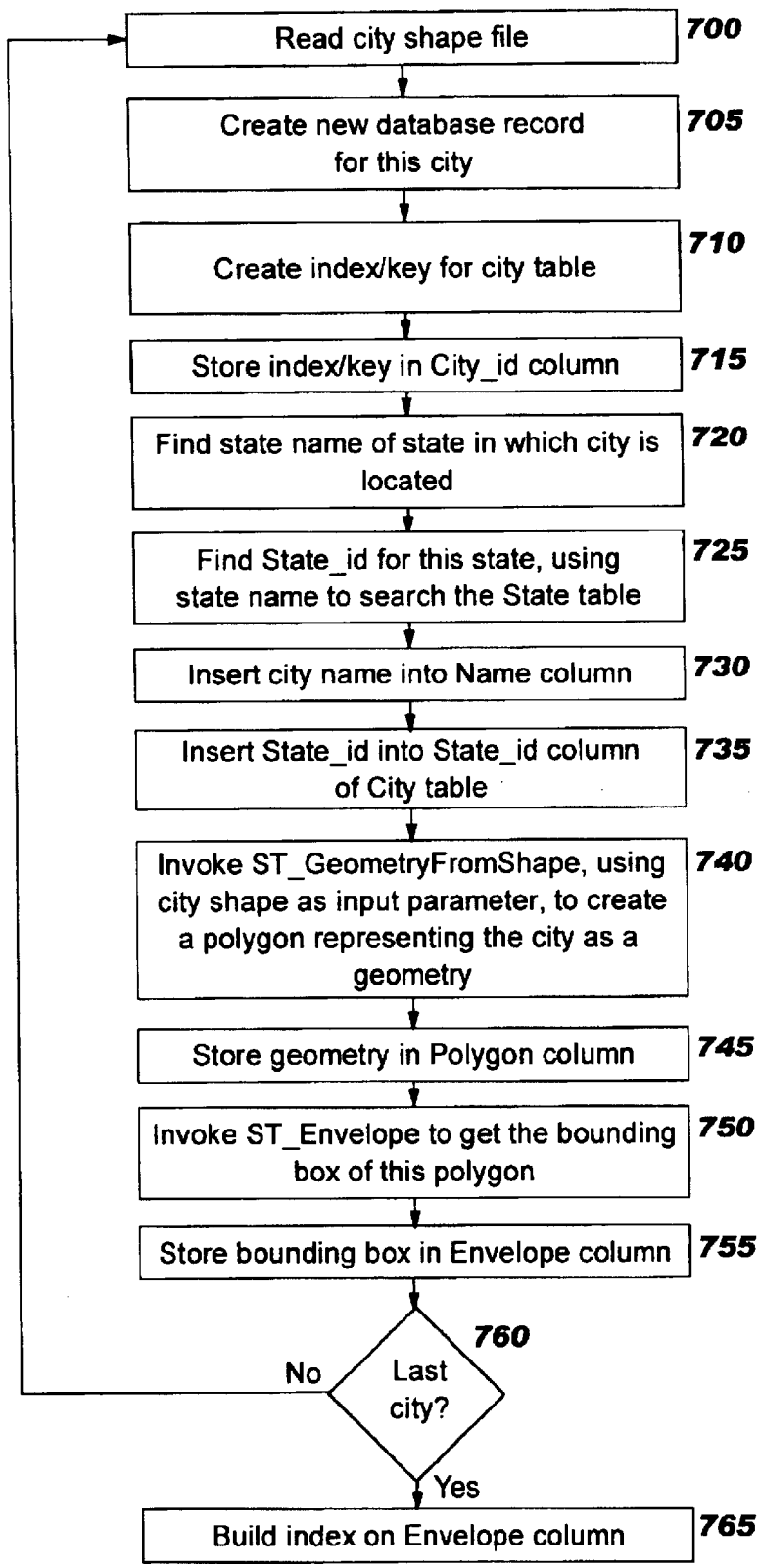

FIG. 7 provides logic which may be used to populate city table 430 of FIG. 4. The process begins at Block 700, where a city shape file (preferably encoded as an ".shp" shape file) is read. Block 705 creates a new record (i.e. row) to represent this city in the city table, and Blocks 710–755 populate the columns of that row. Block 710 generates a primary key to be used as an index to this row. This index value may be created in several different ways, without deviating from the inventive concepts disclosed herein, as has been described above for the index to the state table. The generated value is stored in the "city_id" column (Block 715).

The name of the state in which this city is located is determined (Block 720). The manner in which the association between a city and its state is made does not form part of the present invention. As one example of such an association, preferred embodiments extract the city names from the textual address input file, and the logic of FIG. 7 iterates over the collection of these city names. The corresponding state name is preferably extracted with each city name. This approach ensures that the city names which are used in more than one state will have unique rows in the city table for the city in each of those states.

Block 725 locates the state_id index value for this city's state, preferably by using the state name to search through the state table. In preferred embodiments, a built-in generic comparison function provided by the database system is used. For example, to locate the row for North Carolina from the state table, the following reference may be used:

State.name='North Carolina'

Alternatively, the Text Extender feature of DB2 may be used to perform a linguistic search of the name column of the state table.

As noted above, the abbreviated postal code version of the state name may be used as an alternative to using the full state name. Thus, an alterative technique for locating the row for North Carolina in the state table is as follows:

State.abbr_name='NC'

The textual city name is stored in the "name" column (Block 730). Preferably, the city name associated with the current city shape file is used for this purpose. As discussed with reference to Block 620 of FIG. 6, the city name for a particular city may from part of the shape file's naming structure. (For example, the city shape file for Beaufort, N.C. might be named "beaufort_nc.shp", while the city shape file for Beaufort, S.C. might be named "beaufort_sc.shp".)

Block 735 stores the state_id value for this city's state in the "state_id" column.

The city shape file obtained at Block 700 is passed as an input parameter to a built-in function, which in preferred embodiments is the "ST_GeometryFromShape" function (Block 740). This built-in function will return a polygon when the input parameter represents a city's shape file; that polygon defines the perimeter or boundary of the city. This polygon is stored in the "polygon" column of the city file (Block 745). A built-in function is then invoked (Block 750) to generate a bounding box corresponding to this polygon. In preferred embodiments, this built-in function is "ST_Envelope". The bounding box which is returned from the invocation is stored in the "envelope" column of the city file (Block 755).

Upon reaching Block 760, the new database record for the city table has been populated. Block 760 then checks to see if this was the last city. If the test in Block 760 has a negative result (i.e. there are still more cities to process), then control returns to Block 700 to begin processing the next city; otherwise, processing continues at Block 765.

Block 765 builds an index on the "envelope" column of the city table. As stated with reference to Block 650 of FIG. 6, creation of this index may be omitted without deviating from the scope of the present invention.

Figure 8:
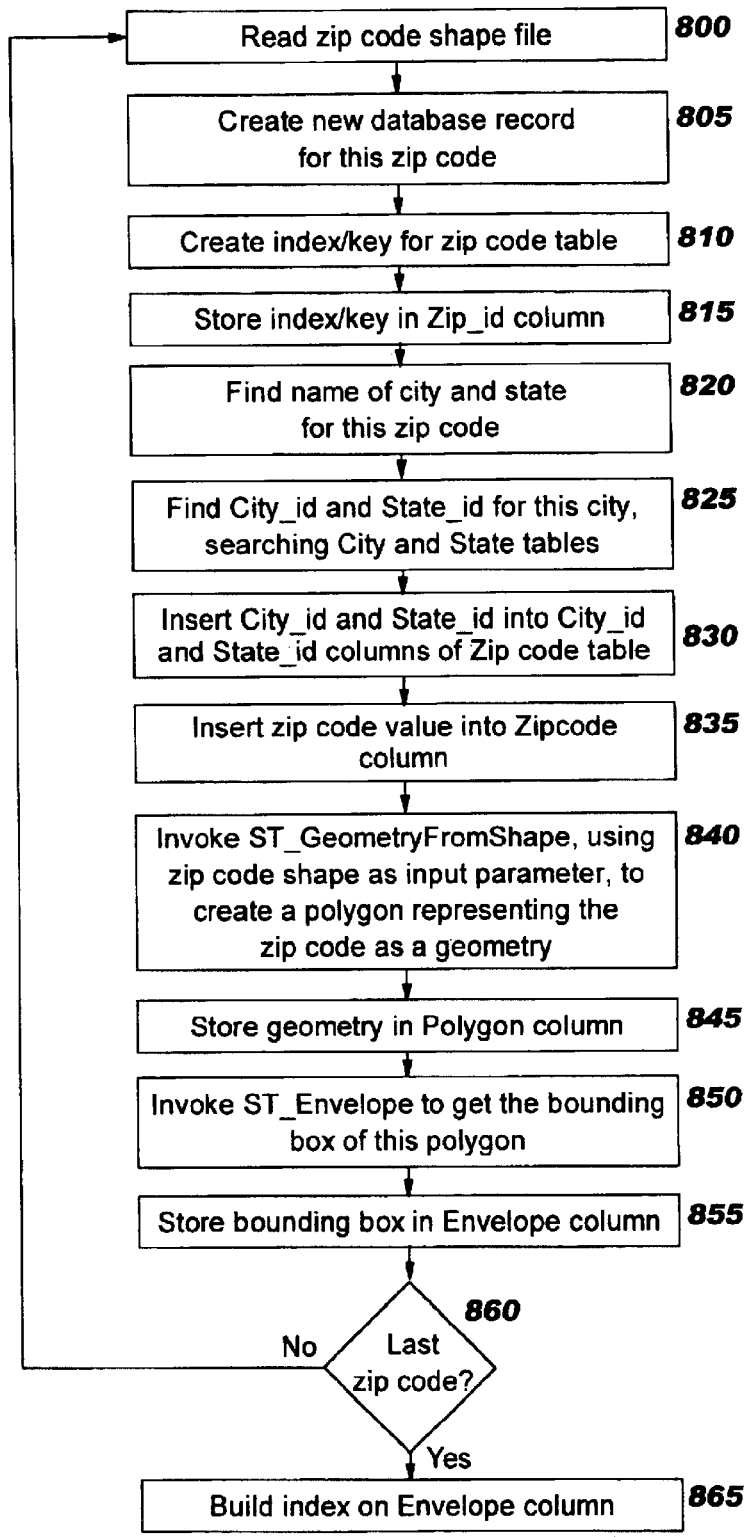

The logic in FIG. 8 may be used to populate zip code table 460 of FIG. 4. It is assumed that a collection of zip codes is available, and the entries in this collection are iteratively processed according to FIG. 8. The collection of zip codes may be obtained, as one example, by extracting zip code values from the textual address input file. Preferably, the city and state name which correspond to each individual zip code are also extracted. As an alternative, a zip code file might be used to drive the processing of FIG. 8. Zip code files may be obtained from commercial or governmental sources, such as a zip code directory file created by the United States Postal Service, and typically contain the city and the state to which that zip code is assigned. When this type of zip code directory is available, the processing of FIGS. 6–8 may be adapted to process each entry from the directory, or alternatively, may use the directory as a source file to retrieve only that information needed for the current textual address input file.

It should also be noted that, although the logic of FIGS. 6–8 shows the state, city, and zip code information being processed separately, in an actual implementation of the present invention it may be desirable to combine this logic. That is, the combination of city, state, and zip code may be extracted from each record of the input file, and each of those pieces of information may be processed to create a row in the three corresponding tables before moving on to the next input record. It will be obvious to one of ordinary skill in the art how the logic shown in FIGS. 6–8 may be adapted for such a combination.

The zip code processing for the current zip code begins at Block 800 by retrieving this zip code's shape file (which is preferably encoded as an ".shp" shape file). Block 805 creates a new record (i.e. row) to represent this zip code in the zip code table, and Blocks 810–855 populate the columns of that row. Block 810 generates a primary key to be used as an index to this row, as has been described above for the index to the state and city tables. The generated value is stored in the "zip_id" column (Block 815).

The name of the city and state in which this zip code is located are determined (Block 820). The manner in which the association between a zip code and its corresponding city and state is made does not form part of the present invention. As one example of such an association, preferred embodiments extract the zip codes from the textual address input file, and the logic of FIG. 8 iterates over the collection of these zip codes; as the zip codes are extracted from the textual address file, the corresponding city and state names may also be extracted with each zip code, as has been discussed above. Alternatively, each zip code may be used to access a separate file which specifies the city and state in which that zip code is located, such as the directory of zip codes which was discussed above, and the specified city and state names from that separate file may be used while iterating through the logic of FIG. 8.

Block 825 locates the city_id and state_id index values for this zip code. Preferably, the city name obtained in Block 820 is used to search through the city table to find one or more matching city rows. In preferred embodiments, a built-in generic comparison function provided by the database system may be used, as was discussed with reference to Block 725 of FIG. 7; or, the Text Extender feature of DB2 may be used to perform a linguistic search of the name column of the city table. For example, to locate the row for Charleston from the city table using the generic comparison function, the following reference may be used:

City.name='Charleston'

If a single row of the city table is located, then this city name only appears in one state (according to the information stored in this database), and the city_id and state_id from this row will be used in Block 830. If more than one row is located, then the city name appears in multiple states. The values of the state_id column from these rows is then preferably used to index into the state table, and the state name obtained in Block 820 is compared to the state names from the indexed rows of the state table until locating a match. When a match is found, this state_id will be used in Block 830 (along with the city_id from the row of the city table that contains the matching state_id).

As an alternative approach, Block 825 may be implemented by using the state name obtained in Block 820 to search through the state table to locate the state_id, and then using this state_id plus the city name obtained in Block 820 to search through the city table to locate the city's city_id. The state_id from the state table and city_id from the city table will then be used in Block 830.

Block 830 stores the located city_id and state_id values into the corresponding columns of the zip code table, and Block 835 inserts the zip code value into the zipcode column.

Block 840 invokes a built-in function, which in preferred embodiments is the "ST_GeometryFromShape" function, using the zip code shape file obtained at Block 800 as an input parameter. This built-in function returns a polygon when the input parameter represents a zip code's shape file; that polygon defines the perimeter or boundary of the zip code. This polygon is stored in the "polygon" column of the zip code file (Block 845). Block 850 then invokes a built-in function, which in preferred embodiments is the "ST_Envelope" function, to generate a bounding box corresponding to this polygon. The bounding box which is returned from the invocation is stored in the "envelope" column of the zip code file (Block 855).

Having thus populated the new row for the zip code table, control reaches Block 860, which checks to see if this was the last zip code. If the test in Block 860 has a negative result (i.e. there are still more zip codes to process), then control returns to Block 800 to begin processing the next of the zip codes; otherwise, processing continues at Block 865.

Block 865 builds an index on the "envelope" column of the zip code table. As stated with reference to Block 650 of FIG. 6, creation of this index may be omitted without deviating from the scope of the present invention.

Figure 9:
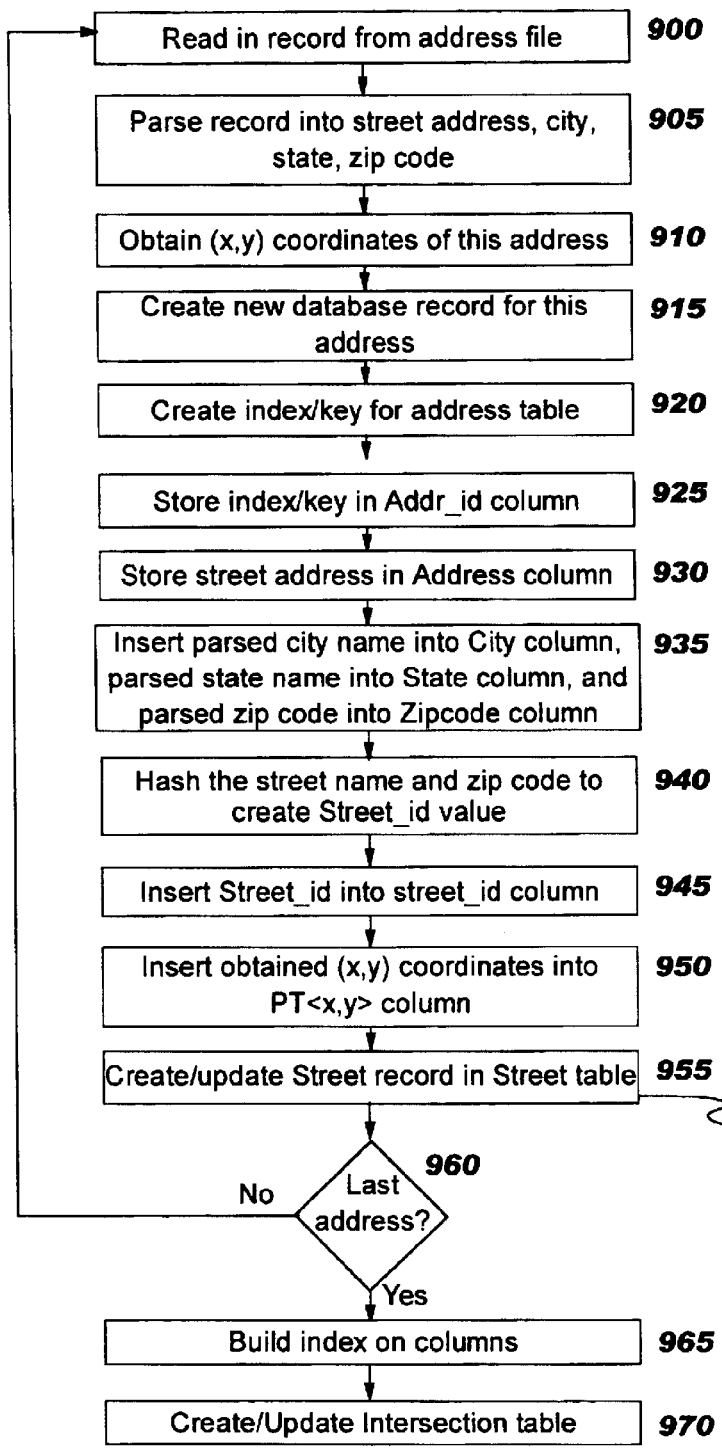
Figure 10:
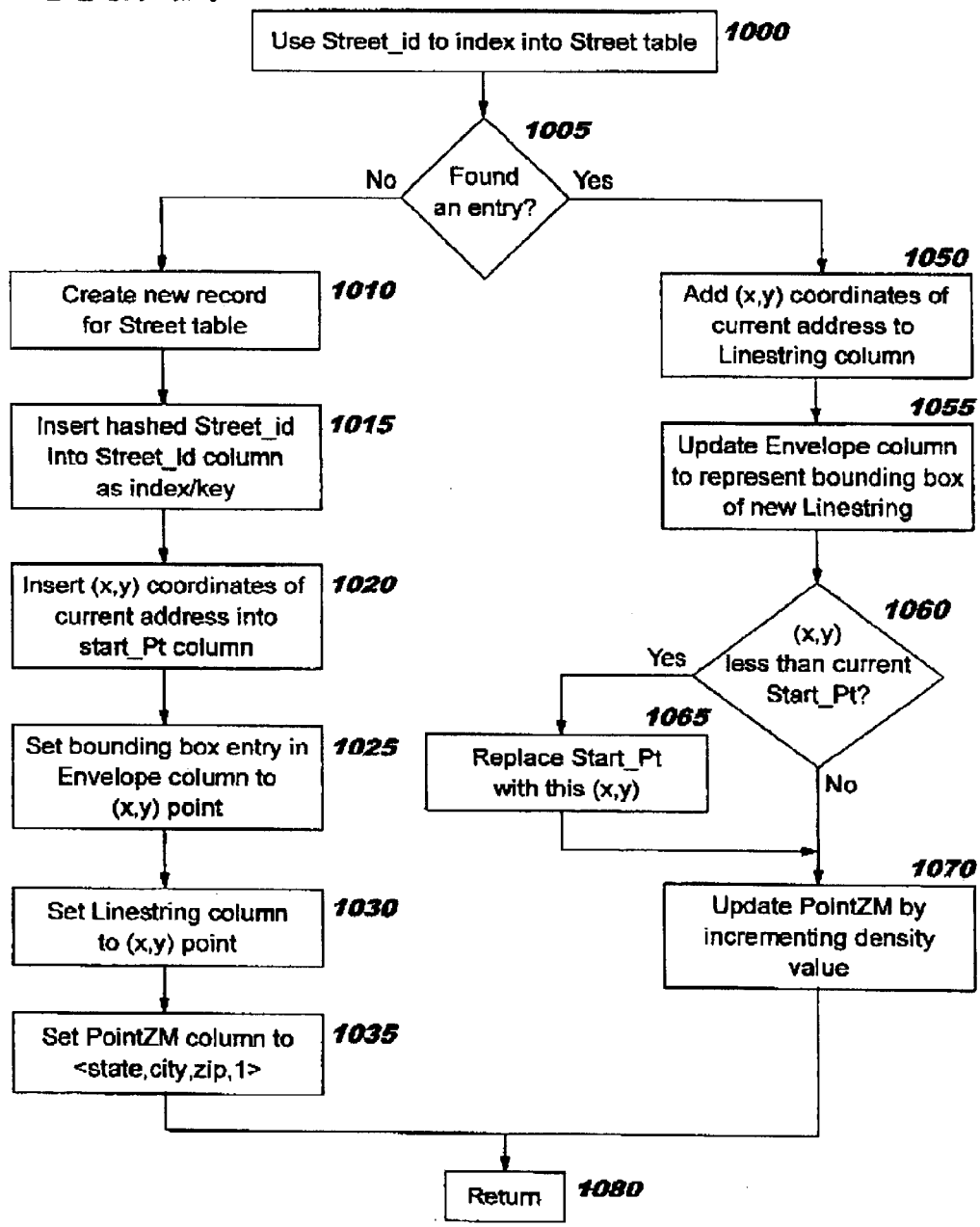

The flowcharts in FIGS. 9 and 10 depict logic which may be used to create the rows of address table 500 and street table 530 of FIG. 5. This process begins at Block 900, which reads a record from the input address file. As stated earlier, this input file is preferably of a type that is commonly available, and in preferred embodiments is encoded as an ASCII file. (Note, however, that the present invention is not limited to use with ASCII notation, and files encoded using other character sets may also be processed advantageously using the techniques disclosed herein.)

Block 905 parses the input record into street address, city, state, and zip code elements. Block 910 then obtains an (x,y) coordinate representation of this address. As stated earlier, an embodiment of the present invention may obtain this representation in several alternative ways. In one approach, the (x,y) coordinates may be included in the input record. In another approach, a lookup function may be used to determine a mapping of an address to a point representing that address's geographic location. Alternative techniques for obtaining the (x,y) coordinates may be substituted without deviating from the scope of the present invention.

Block 915 creates a new record (i.e. row) to represent this address in the address table, and Blocks 920–955 populate the columns of that row. Block 920 generates a primary key to be used as an index to this row, as has been described above for the indexes of other tables. The generated value is stored in the "addr_id" column (Block 925).

The street portion of the address is stored in the "address" column (Block 930). The parsed city name, state name, and zip code are stored in the corresponding "city", "state", and "zipcode" columns (Block 935). (As stated above, references to the address's city, state, and zip code might be stored in addition to, or instead of, these textual values.)

Block 940 generates a hashed value of the street name and zip code values for this address, thereby creating a "street_id" value. This value is then inserted into the "street_id" column of the address table in Block 945 (and will also be used as an index into the street table, as described below with reference to FIG. 10). (In alternative embodiments, other collections of values might be used to create this hashed value. For example, the street name, city, state, and/or zip code may be used. References hereinafter to using the street name and zip code should be interpreted as including these alternative approaches.) Block 950 inserts the (x,y) coordinates which were obtained in Block 910 into the "PT<x,y>" column.

At this point, the columns of the current row of the address table have been populated. Block 955 then creates or updates a corresponding row in the street table. Refer to the discussion of FIG. 10 for details on how this create/update processing occurs in preferred embodiments.

Upon returning from the processing of FIG. 10, Block 960 of FIG. 9 checks to see if this was the last address record from the input file. If not, control returns to Block 900 to begin processing the next address record; otherwise, processing continues at Block 965.

Block 965 builds an index on the combination of the address, city, state, and zipcode columns of the address table. This index may be used for optimizing retrieval of information from the address table, and thus is not strictly necessary for an implementation of the present invention.

Block 970 performs optional processing to build an intersection table representing intersections of the streets in the street table. (See table 560 of FIG. 5 for an example.) This intersection processing is described in more detail below with reference to FIGS. 11 and 12.

The creation of the address and street tables, and of the optional intersection table, is then complete. The information represented in the tables of the spatial data mart may then be used in many advantageous ways. One example is disclosed in the path computation invention, whereby the shortest-path distance between two points can be derived in an optimal manner.

Turning now to the flowcharts in FIGS. 10 and 11, creation/updating of rows in the street table and optional intersection table will now be described.

FIG. 10 is invoked from Block 955 of FIG. 9, and depicts logic which may be used in preferred embodiments to populate the street table (see table 530 of FIG. 5). Upon entry to FIG. 10, a street_id value has already been created (in Block 940 of FIG. 9) that serves as a primary key/index to locate a row in the street table; this row corresponds to the street portion of the address being processed in FIG. 9, for a particular zip code. Thus, Block 1000 uses this street_id value to access the street table. Block 1005 tests whether a row was located. If not, then processing continues at Block 1010 to create a new row; otherwise, processing continues at Block 1050 to update the located row.

In Block 1010, a new record/row is created for the street table. Blocks 1015–1035 then populate the columns for this new row. Block 1015 inserts the already-created hashed street_id value into the street_id column of the street table.

Block 1020 inserts the (x,y) coordinates obtained in Block 910 of FIG. 9 into the "start_Pt" column, indicating a starting point for this street. (This starting point may be revised as additional addresses on the street are processed. See the description of Blocks 1060 and 1065, below.) Block 1025 then preferably stores the (x,y) coordinates in the "envelope" column of the street table: since only one point on the street is currently known, the bounding box for the street is represented by a single point. Similarly, Block 1030 preferably stores the (x,y) coordinates in the "linestring" column, representing the street (for now) by this single point.

In Block 1035, the "PointZM" column for this street's row is initialized. As has been stated earlier, the PointZM geometric data type is adapted in a novel manner by the present invention for storing street geometry information. Rather than the conventional (x,y,z,m) connotation, a PointZM value created according to the present invention represents the state, city, zip code, and street density for this street. Note that a street spanning multiple zip codes has a separate row in the street table for each of those zip codes, provided records from the input address file are located for those multiple zip codes.)

The x-coordinate for the PointZM column entry is set to the state_id of the state in which the street corresponding to this street table row is located, the y-coordinate is set to the city_id for the city in which this street is located, and the z-coordinate is set to the zip_id corresponding to the street table row. The state_id, city_id, and zip_id values are readily available if this processing is integrated with the logic of FIGS. 6–8, or may be determined using lookup techniques as has been described. (See the discussion of Block 825, above, for example.) The m-coordinate is used as a counter, in preferred embodiments, to calculate the density of addresses occurring on this street. Thus, the m-coordinate is initialized to one during the processing of Block 1035. Block 1035.

After completing Block 1035, the processing of FIG. 10 is complete for this invocation, and control returns (Block 1080) to the invoking logic in FIG. 9.

Block 1050 begins the processing for updating a row of the street table, when an address is being processed for a street/zip code combination that already has a street table row.

In Block 1050, the (x,y) coordinates for the current address are added to the "linestring" column. In preferred embodiments, each point is added to the linestring such that the result is a geographically-ordered collection of points along the street. The following technique may be used for this purpose:

(1) Retrieve the existing points from the linestring column. Representative syntax with which this may be accomplished is as follows:

CAST db2gse.ST_AsText (Street.linestring) AS varchar (600)

That is, the linestring is passed as input to the ST_AsText function, which returns the WKT representation for the linestring geometry, and the points on the linestring are then cast as text values.

(2) Extract the points P1, P2, . . . Pn from the result of (1). For example, a substring function may be used on the collection of text values.

(3) Append the (x,y) coordinates for the current address to this collection, creating a new collection P1, P2, . . . Pn, Pn+1.

(4) Construct a new linestring to represent the new collection of points. Representative syntax with which this may be accomplished is as follows:

ST_LineFromText (Linestring (P1, P2, . . . Pn, Pn+1), db2gse.coordref( )..srid(0))

The resulting linestring is then stored in the linestring column as a replacement for the previous contents, and Block 1055 replaces the contents of the envelope column with a bounding box corresponding to this new linestring.

Block 1060 tests to see if the current (x,y) coordinates represent a point that is "less than" the currently-known starting point for this street. In terms of GIS values, a point (x1,y1) is less than another point (x2,y2) if point (x1,y1) is geographically located (1) to the west of point (x2,y2) and/or (2) to the south of point (x2,y2). A built-in function may be used for this comparison. If this test has a positive result, then a new starting point for this street has been found, and Block 1065 replaces the previously-stored contents of the "start_Pt" column with the current (x,y) coordinates.

Block 1070 updates the "PointZM" column for this row by incrementing the m-coordinate (i.e. street density), thus indicating that an additional address for this state/city/street/zip code has been found.

After completing Block 1070, the processing of FIG. 10 is complete for this invocation, and control returns (Block 1080) to the invoking logic in FIG. 9.

Figure 11:
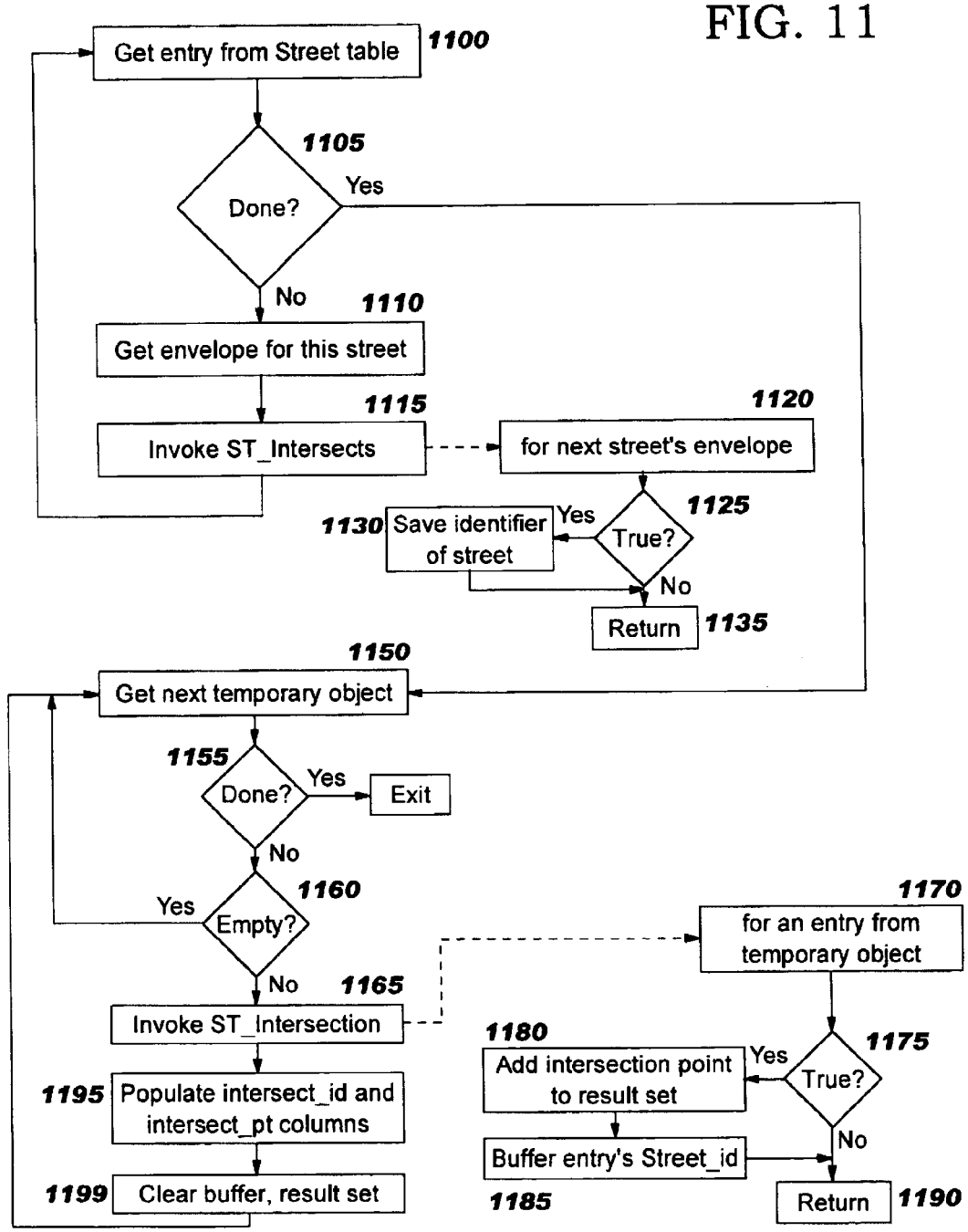
Figure 12A:
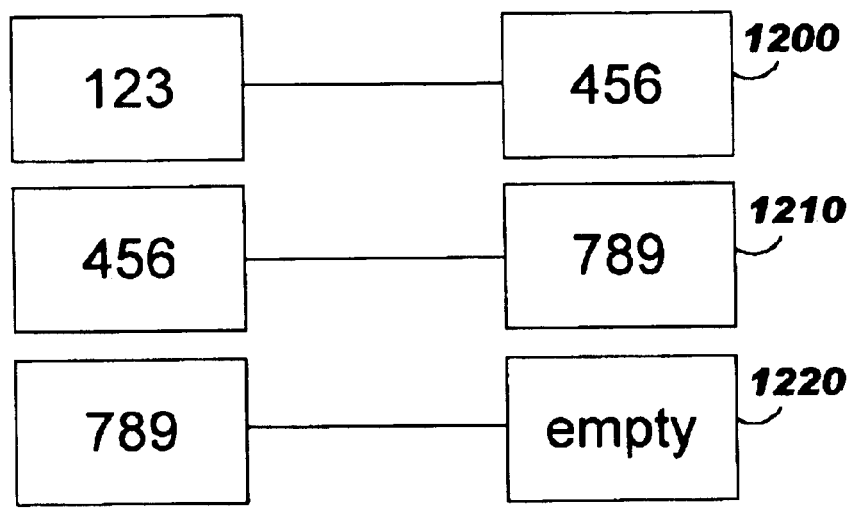
FIGS. 12A and 12B provide a representation of objects for use in illustrating operation of FIG. 11.
Figure 12B:
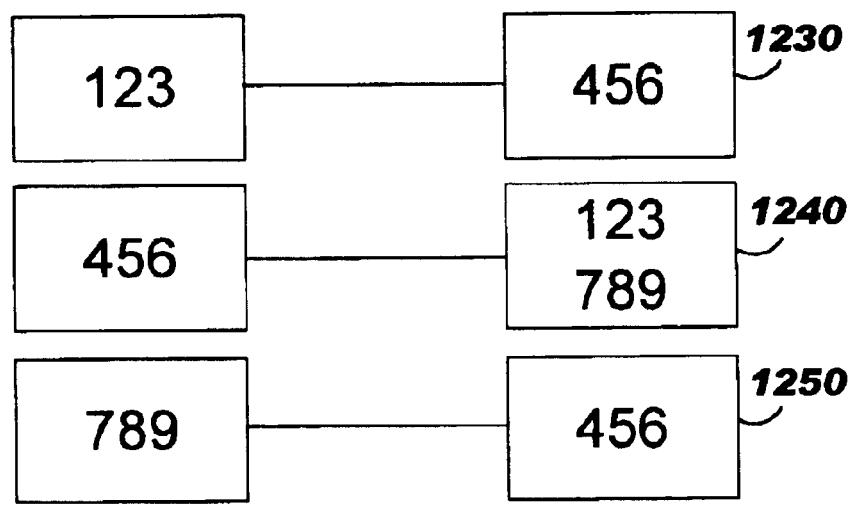

FIG. 11 depicts logic that may be used in preferred embodiments to build the rows of intersection table 560 of FIG. 5, providing intersection information pertaining to the streets which are represented in street table 530. FIG. 12 (comprising FIGS. 12A and 12B), described below, provides an example that is used to illustrate operation of this logic in more detail.

To begin the intersection processing, Block 1100 gets the next row from the street table. Block 1105 checks to see if end-of-file has been reached, and if so, control transfers to Block 1150. Otherwise, the retrieved street table entry is processed according to the logic of Blocks 1110–1135.

To determine whether two streets intersect, preferred embodiments first compare the envelopes which represent the linestrings for the streets. If the envelopes do not intersect, then the linestrings do not intersect, and therefore this comparison provides a first filter to exclude unnecessary rows from further processing. (The built-in spatial database functions enable efficiently making this determination using the grid index built for the envelope.) Block 1170, described below, checks to see if the linestrings actually intersect. Thus, for applying the first filter, Block 1110 gets the envelope associated with this street from the "envelope" column of the street table row. In Block 1115 a function, which in preferred embodiments is the "ST_Intersects" function of Spatial Extender, is invoked against each of the other street envelopes, in turn. (That is, for row 1 of the street table, ST_Intersects is invoked against the street envelopes for rows 2-n; for row 2 of the street table, ST_Intersects is invoked against the street envelopes for rows 3-n; and so forth.) This processing is depicted in more detail in Blocks 1120–1135. Block 1120 corresponds to the invocation of ST_Intersects for a particular row. The ST_Intersects function returns a true or false result, which is tested by Block 1125. If a true result is returned, then Block 1130 saves an identifier of the street in a temporary object or variable referred to herein as "envelope_intersects", which is created for the street which was retrieved by Block 1100. This invocation is then complete, and control returns (Block 1135) to the invoking logic in Block 1115. Block 1115 continues to iterate through the remaining other streets of the street table, as described above.

In preferred embodiments, the processing of Blocks 1120–1135 may be implemented using a Structured Query Language ("SQL") command which tests for the intersection result in its "WHERE" clause and returns an identifier of the intersecting street in its "SELECT" clause.

Once the streets of the street table have been processed against the current street, control returns from Block 1115 to Block 1100 to begin processing the next row from the street table.

Block 1150 is reached when each of the rows of the street table has been processed, creating a temporary "envelope_intersects" object for each street. Block 1150 gets the next one of these temporary objects, and Block 1155 checks to see if end-of-file has been reached. If this test has a positive result, then the populating of intersection table 560 is complete, and FIG. 11 is exited. Otherwise, processing continues at Block 1160.

Block 1160 checks to see if the current "envelope_intersects" object is empty. For streets that are intersected by other streets, the street's temporary object will contain a set of one or more envelopes. Thus, if the object for a particular street is empty, control returns to Block 1150 to get the next temporary object, and if not, processing continues at Block 1165.

In Block 1165 a function, which in preferred embodiments is the "ST_Intersection" function of Spatial Extender, is invoked against each entry in the current "envelope_intersects" temporary object, in turn. This processing is depicted in more detail in Blocks 1170–1190.

Referring briefly to FIG. 12A, an example is provided to illustrate operation of the logic in FIG. 11. Suppose that street table 530 in FIG. 5 is being processed. The rows of intersection table 560 illustrate that (1) High House Rd intersects with Hudson Rd; (2) Hudson Rd intersects with High House Rd and Davis Dr; and (3) Davis Dr intersects with Hudson Rd. Thus, when Blocks 1100–1135 process the street table row for High House Rd (having street_id "123"), the resulting temporary envelope_intersects object 1200 of FIG. 12 is created. (As will be obvious, the graphic presented for object 1200 is merely an abstract representation of the temporary object's contents. The first row of table 530 is compared to the second and third rows during the processing of Block 1115, and thus object 1200 represents the comparison of street_id "123" with street_id's "456" and "789".) As depicted by object 1200, street "123" (High House Rd) has a single entry in its temporary object 1200, where this single entry identifies street "456" (Hudson Rd) as intersecting with street "123". When Blocks 1100–1135 process the street table row for Hudson Rd (having street_id "456"), the second row of table 530 is compared to the third row. Object 1210 depicts the resulting temporary object, showing that street "456" intersects with street "789" Davis Dr. Finally, when Blocks 1100–1135 are executed for Davis Dr (street_id "789"), which is the last row in table 530, the resulting temporary object is empty, as shown by object 1220.

Thus, when Block 1165 invokes the processing of Blocks 1170–1190 for object 1200, the intersection point of object 1200's associated street (i.e. the street having street_id "123") and the single street represented by object 1200 (having street_id "456") is determined. In the example, this intersection point is the intersection of High House Rd with Hudson Rd. When processing object 1210, its corresponding intersection point will be determined by performing a similar iteration of the logic in Blocks 1170–1190, finding the intersection of Hudson Rd with Davis Dr.

Returning now to the discussion of FIG. 11, Block 1170 invokes the S_Intersection function for a particular entry "X" from the current street's temporary envelope_intersects object, and passes as parameters the current street's linestring and the linestring corresponding to "X". (That is, for object 1200, ST_Intersection is invoked once, passing the linestring for High House Rd and the linestring for Hudson Rd; for object 1210, the invocation of ST_Intersection uses the linestrings for Hudson Rd and Davis Dr.) This invocation may be expressed as follows:

db2gse.ST_Intersection
        (g1 db2gse.ST_GeometryFromShape,
        g2 db2gse.ST_GeometryFromShape)

where g1 is the current street's linestring object and g2 is the linestring for "X". (This invocation passes two geometries, g1 and g2, where g1 is the linestring for one street and g2 is the linestring for the other street.)

Block 1175 tests the result of the ST_Intersection invocation. If the result is false, then control transfers to Block 1190, which returns to the invoking logic (in Block 1165). If the result is true, then Block 1180 adds the intersection point for the streets to a temporary result set created for the current street's row, and Block 1185 buffers the associated street_id value (which may be obtained by using the street identifier for "X" to locate the matching row of the street table). During this processing, the reciprocal version of the intersection is also preferably created. Referring to FIGS. 12A and 12B, suppose temporary object 1200 of FIG. 12A is being processed. This temporary object 1200 represents the intersection point for street "123" with street "456". After processing this object to create temporary result set 1230 of FIG. 12B, the reciprocal entry for street "456" intersecting with street "123" is also created, and is added to temporary result set 1240 of FIG. 12B. This invocation is then complete, and control returns (Block 1190) to the invoking logic in Block 1165. Similarly, when processing temporary object 1210 of FIG. 12A to add the intersection of streets "456" and "789" to temporary result set 1240 (such that result set 1240 then has two entries), the reciprocal entry for streets "789" and "456" is added to temporary result set 1250. (As will be obvious, there are several alternative techniques with which the reciprocal intersections may be created, and an alternative approach may be substituted without deviating from the scope of the present invention. For example, a table could be created that stores each intersection, and this table can then be processed to locate all entries pertaining to a selected street_id value.)

Block 1165 continues to iterate through the remaining entries in this temporary object, as described above. Once the current temporary object has been processed according to Blocks 1170–1190, control reaches Block 1195 which populates the intersect_id and intersect_pt columns of the intersection table with the contents of the buffer and temporary result set (including the reciprocal information), respectively. Block 1199 then clears the buffer and temporary result set, and control returns to Block 1150 to begin processing the next one of the temporary envelope_intersects objects. One or more side tables, such as points of interest table 270 of FIG. 2, may also be created, if desired. As shown in FIG. 2, the sample table includes an index ("rid"), a "type" column (identifying the type of landmark represented by this row, for example), a "name" column (providing the name of the landmark), and a "phone" columm (providing a phone number of the landmark).

As has been demonstrated, the present invention provides a number of advantages. The disclosed techniques make use of relational databases (e.g. normalization and indexing) as well as spatial enablement and enable using normalized data to resolve street geometries. Commonly-available textual information can be used to populate the spatially-enabled database when using the disclosed techniques. This is in contrast to the prior art approach of using proprietary binary files (and in particular, *.shp files for street geometry definition and EDG files for street names) and files in WKT format for processing and storing street geometries. The derived street geometry data then supports retrieval operations without relying on proprietary formats or binary files, thus offering increased speed and reduced system resource requirements. The intersection table may be used for applications such as the efficient path calculation technique disclosed in the path computation invention. The PointZM column can be utilized by e-business applications to determine the density of selected streets. Points of interest may optionally be associated with address coordinates. Furthermore, it should be noted that the same coordinate reference system used with Global Positioning System ("GPS"), which is known as "GCS_North_America_1983", may be used with the present invention, thereby facilitating integration between implementations of the present invention and GPS implementations.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications may occur to those skilled in the art once they learn of the basic inventive concepts. Therefore, it is intended that the appended claims shall be construed to include the preferred embodiments and all such variations and modifications as fall within the spirit and scope of the invention.

What is claimed:

1. A method of programmatically computing street intersections using street geometry, comprising steps of:
    obtaining street geometry information for a first street;
    comparing the obtained street geometry information for the first street to obtained street geometry information for one or more other streets to determine intersecting ones of the one or more other streets, further comprising steps of:
        comparing a bounding box corresponding to a geometric line representation of the first street to the bounding box corresponding to the geometric line representation of a selected one of the one or more other streets; and if the step of comparing the bounding boxes determines a potential intersection, comparing the geometric line representation of the first street to the geometric line representation of the selected one of the other streets;

for each of the intersecting ones, storing a geographic location of a point of intersection, along with an identification of the first street and the identification of the intersecting one.

2. The method according to claim 1, wherein the obtained street geometry information originates from textual address information.

3. The method according to claim 1, wherein the geographic location comprises latitude and longitude values of the intersection point.

4. The method according to claim 1, wherein the storing step stores geographic locations as geometric data.

5. The method according to claim 1, wherein the storing step further comprises the step of storing a reciprocal comprising the geographic location of the point of intersection, along with the identification of the intersecting one and the identification of the first street.

6. The method according to claim 1, wherein the obtained street geometry information is retrieved from a database table.

7. The method according to claim 1, wherein the obtained street geometry information is dynamically computed from textual address information.

8. The method according to claim 1, further comprising the step of repeating the obtaining, comparing, and storing steps for at least one of the one or more other streets.

9. The method according to claim 1, wherein the storing step further comprises the step of creating or updating a row in a relational database table.

10. A system for programmatically computing street intersections using street geometry, comprising:

means for obtaining street geometry information for a first street;

means for comparing the obtained street geometry information for the first street to obtained street geometry information for one or more other streets to determine intersecting ones of the one or more other streets, further comprising:

means for comparing a bounding box corresponding to a geometric line representation of the first street to the bounding box corresponding to the geometric line representation of a selected one of the one or more other streets; and means for comparing the geometric line representation of the first street to the geometric line representation of the selected one of the other streets if the means for comparing the bounding boxes determines a potential intersection;

for each of the intersecting ones, means for storing (1) a geographic location of a point of intersection, along with an identification of the first street and the identification of the intersecting one, in a relational database table; and (2) a reciprocal comprising the geographic location of the point of intersection, along with the identification of the intersecting one and the identification of the first street.

11. The system according to claim 10, wherein the geographic location comprises latitude and longitude values of the intersection point.

12. A computer program product for programmatically computing street intersections using street geometry, the computer program product embodied on one or more computer-readable media and comprising:

computer-readable program code means for obtaining street geometry information for a first street;

computer-readable program code means for comparing the obtained street geometry information for the first street to obtained street geometry information for one or more other streets to determine intersecting ones of the one or more other streets, further comprising:

computer-readable program code means for comparing a bounding box corresponding to a geometric line representation of the first street to the bounding box corresponding to the geometric line representation of a selected one of the one or more other streets; and computer-readable program code means for comparing the geometric line representation of the first street to the geometric line representation of the selected one of the other streets if the computer-readable program code means for comparing the bounding boxes determines a potential intersectionl;

for each of the intersecting ones, computer-readable program code means for storing (1) a geographic location of a point of intersection, along with an identification of the first street and the identification of the intersecting one, in a relational database table; and (2) a reciprocal comprising the geographic location of the point of intersection, along with the identification of the intersecting one and the identification of the first street; and computer-readable program code means for repeating operation of the computer-readable program code means for obtaining, computer-readable program code means for comparing, and computer-readable program code means for storing, for at least one of the one or more other streets.

13. A method of programmatically computing street intersections using street geometry, comprising steps of:

comparing a bounding box corresponding to a geometric line representation of a first street to the bounding box corresponding to the geometric line representation of at least one selected one of one or more other streets; and for each bounding box comparison that determines a potential intersection, comparing the geometric line representation of the first street to the geometric line representation of the selected street to determine whether the first street and the selected street intersect.

14. The method according to claim 13, wherein the step of comparing the geometric line representations further comprises the step of determining a point of intersection between the first street and the selected street when it is determined that the first street and the selected street intersect.

15. A method of programmatically computing street intersections using street geometry, comprising steps of:

comparing a bounding box corresponding to a geometric line representation of a first street to the bounding box corresponding to the geometric line representation of each of one or more other streets;

for each bounding box comparison that determines a potential intersection, comparing the geometric line representation of the first street to the geometric line representation of the other street; and for each geometric line representation comparison that determines an actual intersection, determining a geographic location of a point of the actual intersection.

* * * * *